(12) United States Patent
Cui et al.

(10) Patent No.: US 11,377,962 B2
(45) Date of Patent: Jul. 5, 2022

(54) CLOSURE ELEMENT WITH EXTENSIONS FOR INTERNAL PASSAGE OF COMPONENT

(71) Applicant: General Electric Company, Schenectady, NY (US)

(72) Inventors: Yan Cui, Greer, SC (US); Michael Douglas Arnett, Simpsonville, SC (US); Matthew Joseph Laylock, Easley, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 16/561,730

(22) Filed: Sep. 5, 2019

(65) Prior Publication Data

US 2021/0071533 A1  Mar. 11, 2021

(51) Int. Cl.
*F01D 5/14* (2006.01)
*B23K 1/00* (2006.01)
*C22C 19/00* (2006.01)
*C22C 35/00* (2006.01)

(52) U.S. Cl.
CPC ............ *F01D 5/147* (2013.01); *B23K 1/0018* (2013.01); *C22C 19/00* (2013.01); *C22C 35/005* (2013.01); *F05D 2230/211* (2013.01)

(58) Field of Classification Search
CPC ......... F01D 5/147; F01D 5/18; B23K 1/0018; B23K 35/3033; C22C 19/00; C22C 35/005; F05D 2230/211
See application file for complete search history.

(56) References Cited

U.S. PATENT DOCUMENTS

| | | | |
|---|---|---|---|
| 3,952,395 A | 4/1976 | Crossman et al. |
| 8,454,301 B1 | 6/2013 | Liang |
| 9,528,379 B2 | 12/2016 | Herzlinger et al. |
| 9,765,630 B2 | 9/2017 | Herzlinger et al. |
| 2010/0059573 A1 | 3/2010 | Kottilingam et al. |
| 2018/0093354 A1 | 4/2018 | Cui et al. |
| 2018/0161852 A1 | 6/2018 | McCarren et al. |
| 2018/0209277 A1 | 7/2018 | Dooley et al. |

FOREIGN PATENT DOCUMENTS

EP    3305464 A1    4/2018

OTHER PUBLICATIONS

International Search Report and Written Opinion thereof for corresponding PCT Application No. PCT/US2020/047578 dated Dec. 2, 2020, 12 pages.

*Primary Examiner* — Moshe Wilensky
(74) *Attorney, Agent, or Firm* — James Pemrick; Hoffman Warnick LLC (57) ABSTRACT

A closure element for an internal passage in a component, and a related method and turbine blade or nozzle are disclosed. The closure element includes a spherical body made of a first superalloy, and a plurality of extensions extending from a surface of the spherical body. The plurality of extensions made of the same, similar or different material other than the first superalloy. Subjecting the component to at least one thermal cycle causes a braze material to form a metallurgical bond with the spherical body, the plurality of extensions and the passage wall to seal the internal passage.

19 Claims, 4 Drawing Sheets

CLOSURE ELEMENT WITH EXTENSIONS FOR INTERNAL PASSAGE OF COMPONENT

BACKGROUND OF THE INVENTION

The disclosure relates generally to components having internal passages, and more particularly, to a method using a closure element including a spherical body with a plurality of extensions on a surface of the spherical body for closing an irregular internal passage in the component. The closure element, and a turbine blade or nozzle including the brazed closure element therein, are also provided.

Some components require an internal passage to be defined therein, for example, in order to perform an intended function. For example, hot gas path components of gas turbines are subjected to high temperatures and may have internal passages defined therein to receive a flow of a cooling fluid, such that the components are better able to withstand the high temperatures.

Components having an internal passage defined therein may be formed in a mold, with a core of ceramic material extending within the mold cavity, i.e., as part of an investment casting process. After a molten metal alloy is introduced into the mold cavity around the ceramic core and cooled to form the component, the ceramic core is removed, such as by chemical leaching. An internal passage (sometimes referred to as a "ball chute") may be provided to allow the leachant to exit. Alternatively or additionally, at least some components having an internal passage defined therein are initially formed without the internal passage, and the internal passage is formed in a subsequent process. For example, internal passages may be formed by drilling the preliminary passage into the component, such as, but not limited to, using an electrochemical drilling process.

In some cases it is necessary to form an internal closure within the internal passage in order to produce a selected final configuration of the internal passage. For example, the preliminary internal passage as formed may pass through an outer wall of the component to simplify the forming process, and the internal passage must be sealed internally of the outer wall to properly define the selected final configuration. Additionally or alternatively, the internal passage may be part of a network of internal passages defined within the component, and the internal closure is necessary to produce a selected flow pattern through the network of internal passages.

One approach to forming such internal closures is to insert a metallic closure element within the passage at the selected closure location, and to couple the closure element to the passage walls using, for example, a braze joint to create a seal. The metallic closure element are typically metallic spheres or balls manufactured in standard sizes. The standard-sized metallic balls may not be usable at the closure site in the internal passage where the dimensions of the closure site, e.g., diameter or shape, are out of tolerance. The dimensions may be out tolerance for a number of reasons. For example, an aluminide coating may be formed in the internal passage prior to brazing to seal the passage. The aluminide coating must be removed at the closure site prior to insertion of the closure element and the brazing material. This removal process may be completed, for example, using manual mechanical cleaning methods, which can create oversized closure site dimensions. In this case, the standard-sized balls will not seat at the closure site, and non-standard metallic balls with larger dimensions must be obtained. Other times the closure site is simply formed with a defect in a passage wall, and requires non-standard metallic balls to seal it. In any event, the time and expense of obtaining non-standard metallic balls can be significant, and can greatly delay manufacture of the component.

BRIEF DESCRIPTION OF THE INVENTION

A first aspect of the disclosure provides a closure element for an internal passage in a component, the closure element comprising: a spherical body, the spherical body made of a first superalloy; and a plurality of extensions extending from a surface of the spherical body, the plurality of extensions made of a material other than the first superalloy.

A second aspect of the disclosure provides a method, comprising: inserting a closure element into an internal passage of a component, the closure element including a spherical body and a plurality of extensions extending from a surface of the spherical body, wherein at least one of the plurality of extensions engages with a passage wall of the internal passage to position the spherical body at a closure site; applying a braze material at the closure site; and subjecting the component to at least one thermal cycle such that the braze material forms a metallurgical bond with the spherical body, the plurality of extensions and the passage wall to seal the internal passage.

A third aspect of the disclosure provides a turbine blade or nozzle, comprising: a body; an internal passage in the body, the internal passage including a passage wall; and a closure element at a closure site in the internal passage, the closure element including a brazed spherical body, and a plurality of brazed extensions in a surface of the brazed spherical body, the brazed spherical body and the plurality of brazed extensions forming a metallurgical bond with the passage wall to seal the internal passage.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within, for example, a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to" or "coupled to" another element or layer, it may be directly on, engaged, connected or coupled to the other element or layer, or intervening elements or layers may be present, e.g., indirect mechanical, electrical, and/or communication connections between multiple components. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The disclosure describes a closure element and method that overcome at least some of the disadvantages associated with known methods of sealing an internal passage of a component. The closure element includes a spherical body made of a first superalloy, and a plurality of extensions extending from a surface of the spherical body. The plurality of extensions may be made of a material other than the first superalloy, or they may be made of the same or similar material. The closure element is inserted to a closure site, and the component is subjected to at least one thermal cycle that causes a braze material to form a metallurgical bond with the spherical body, the plurality of extensions and the passage wall to seal the internal passage. A turbine blade or nozzle including the closure element is also disclosed as an illustrative component.

Figure 1:
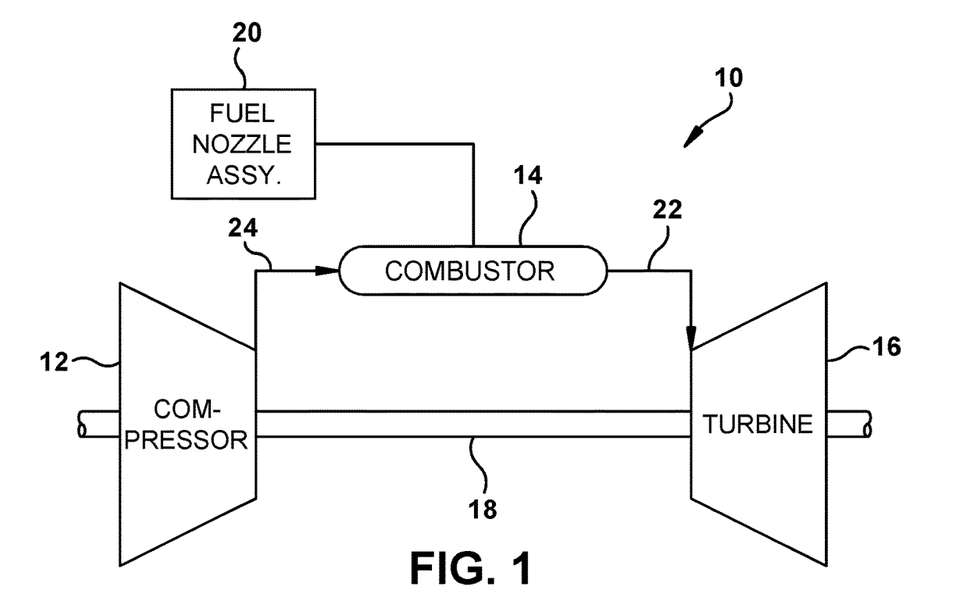
FIG. 1 is a schematic view of an illustrative gas turbine system.

FIG. 1 is a schematic view of a rotary machine, i.e., a turbomachine. In the illustrative embodiment, the rotary machine is a gas turbine system 10. Alternatively, the rotary machine may be any other turbine engine and/or rotary machine, including, without limitation, a steam turbine engine, a centrifugal compressor, and a turbocharger. In the illustrative embodiment, gas turbine system 10 includes at least one of each of a compressor 12, a combustor 14, a turbine 16, and a fuel nozzle 20. Fuel nozzle 20 is configured to inject and mix fuel (not shown) with pressurized air 24 in combustor 14. Combustor 14 ignites and combusts the fuel-air mixture (not shown) and then passes a hot gas flow 22 into turbine 16. Turbine 16 includes one or more stators having fixed nozzles or vanes (not shown in FIG. 1), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to a single rotatable shaft 18 such that it rotates the shaft as hot gas flow 22 passes over the turbine blades. In alternative embodiments, rotatable shaft 18 is a plurality of shaft segments coupled together to form rotatable shaft 18. In the illustrative embodiment, rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient pressurized air 24 for proper combustion.

Figure 2:
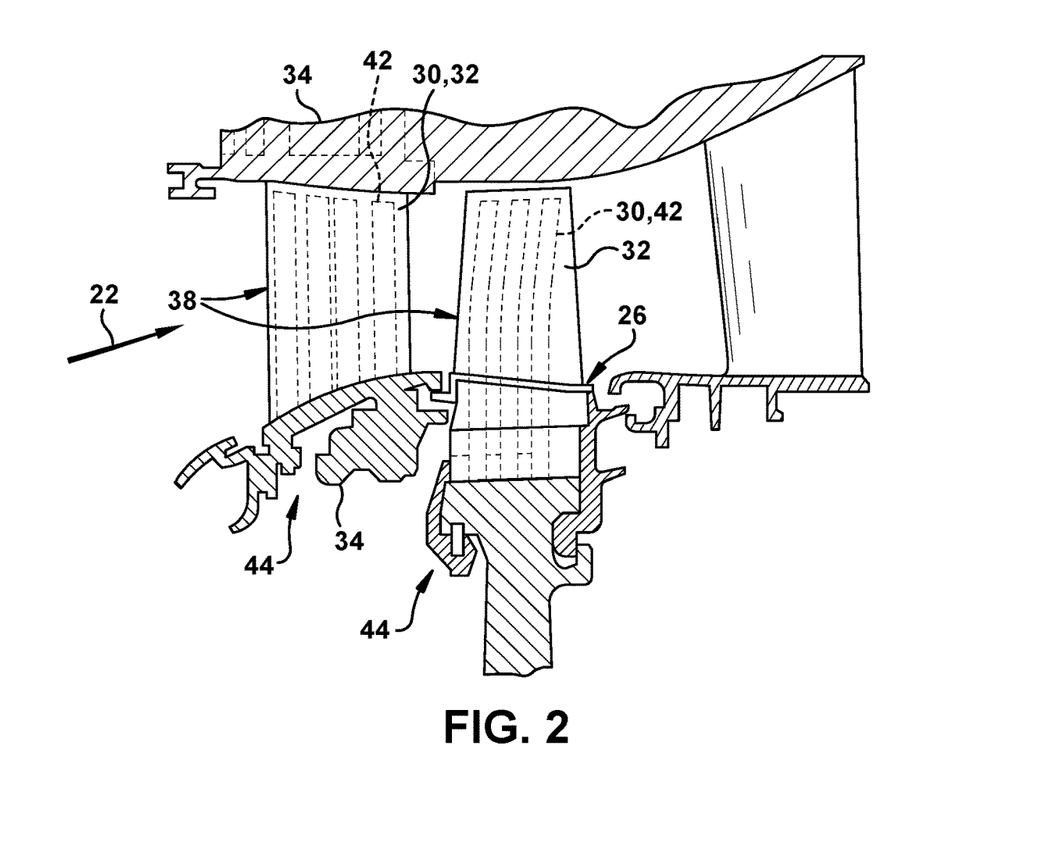
FIG. 2 is a schematic view of a portion of a component of the gas turbine system shown in FIG. 1.

FIG. 2 is a schematic view of a portion of turbine 16 of gas turbine system 10 shown in FIG. 1. Components of gas turbine system 10 suitably formed with an internal passage defined therein are designated as components 38. For example, components 38 include components proximate a path of hot gas flow 22. Such hot gas path components are subjected to high temperatures during operation of gas turbine system 10, e.g., the hot gas flow 22 operating temperature, in one example, is above 2500 degrees Fahrenheit (° F.) (~1371 degrees Celsius (° C.)). Additionally or alternatively, components 38 include any component suitably formed with an internal passage defined therein. In particular, although components 38 are illustrated in the context of gas turbine system 10, it should be understood that the systems and methods described herein are applicable to components for use in any context that utilizes components suitably formed with an internal passage defined therein.

In the illustrative embodiment, gas turbine system 10 includes a cooling system 42 to cool component 38. For example, in the illustrative embodiment, turbine 16 includes at least one turbine blade 26 and at least one stator nozzle or vane 28, and component 38 is at least one of turbine blade 26 and stator nozzle 28. In alternative embodiments, component 38 includes, without limitation, any of other turbine bucket assemblies (also known as blades or blade assemblies), other nozzle assemblies (also known as vanes or vane assemblies), shroud assemblies, transition pieces, retaining rings, and compressor exhaust components. In general, cooling system 42 includes a plurality of internal passages 30 defined within component 38. In the illustrative embodiment, a cooling fluid, e.g., pressurized air 24, is provided to internal passages 30 from a plenum, and the cooling fluid flows through each of internal passages 30, cooling component 38. In alternative embodiments, a fluid other than pressurized air 24 may be used to cool components exposed to hot gas flow 22. It should also be appreciated that the term "fluid" as used herein includes any medium or material that flows, including, but not limited to gas, steam, and air. In the illustrative embodiment, at least one cooling system 42 is defined in each component 38 and is coupled in flow communication with a cooling fluid supply conduit 44 formed in a casing 34 of gas turbine system 10. In the illustrative embodiment, cooling fluid supply conduit 44 is fluidly coupled to compressor 12.

Figure 3:
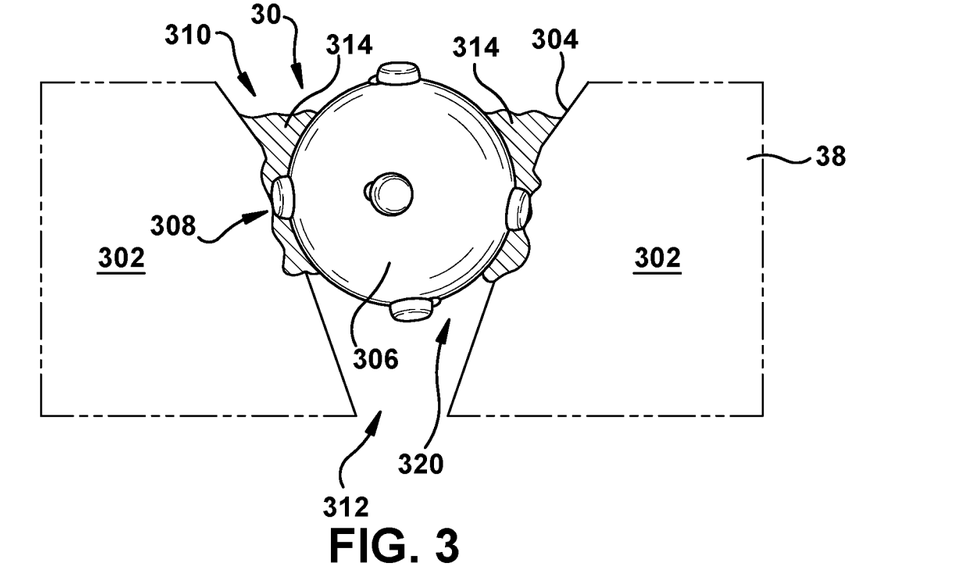
FIG. 3 is a schematic section view of a portion of a component including a closure element according to embodiments of the disclosure.
Figure 4:
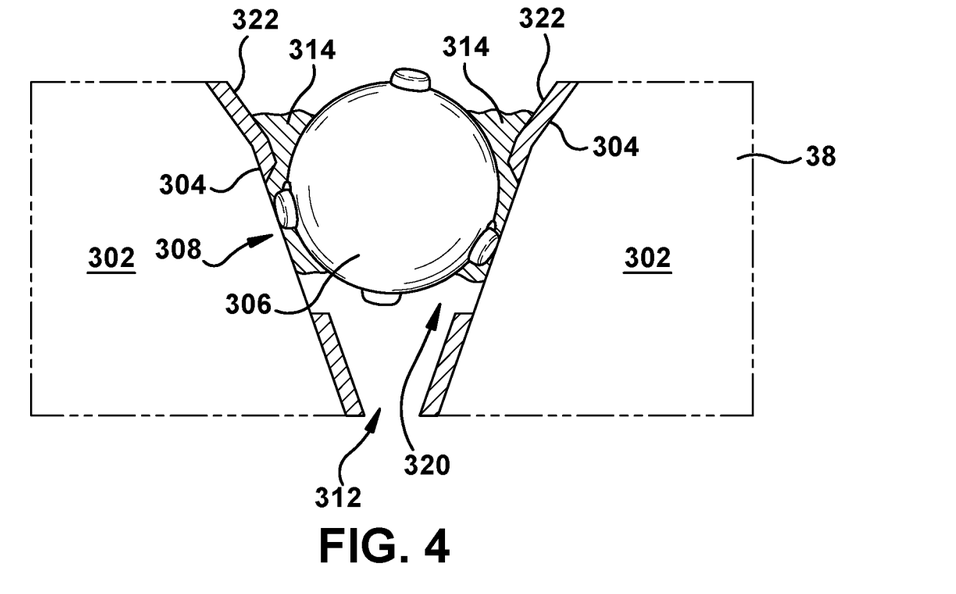
FIG. 4 is a schematic section view of a portion of a component including a closure element according to another embodiment of the disclosure.

FIGS. 3 and 4 are schematic section views of a portion of illustrative embodiments of component 38, such as for use with gas turbine system 10 (shown in FIG. 1). In the illustrative embodiments, component 38 is formed from a substrate 302. In certain embodiments, substrate 302 is formed from a high strength superalloy metal, such as but not limited to at least one of a nickel-based superalloy, a cobalt-based superalloy, an iron-based superalloy, a nickel-aluminum intermetallic alloy, a titanium-aluminum-based intermetallic compound, a niobium-based alloy, and a molybdenum-based alloy. As used herein, "superalloy" refers to an alloy having numerous excellent physical characteristics compared to conventional alloys, such as but not limited to: high mechanical strength, high thermal creep deformation resistance, like Rene 108, CM247, Haynes alloys, Incalloy, MP98T, TMS alloys, CMSX single crystal alloys. In a more specific example, substrate 302 may include Rene 108. In alternative embodiments, substrate 302 is formed from any suitable material that enables component 38 to function as described herein.

As described above, internal passage 30 is defined within component 38. More specifically, internal passage 30 is defined by at least one passage wall 304 that extends interiorly through at least a portion of substrate 302. In certain embodiments, as shown in FIG. 4, a coating 322 is present on the at least one passage wall 304. For example, an anti-oxidizing layer such as an aluminide coating may be formed on an exposed surface of substrate 302 along one or more passage walls 304. In alternative embodiments, any suitable coating, or no coating, is present on the passage wall(s) 304.

Conventionally, a closure element is coupled within internal passage 30 proximate a closure site, and the closure element is sized and shaped to be received against the at least one passage wall 304 proximate closure site 308. More specifically, conventionally, the at least one passage wall 304 defines a generally circular cross-section of internal passage 30 proximate closure site 308, and the closure element is generally spherical or ball-shaped and has a diameter approximately equal to a diameter of internal passage 30 proximate closure site 308. In this manner, the at least one passage wall 304 is shaped to facilitate positioning the closure element proximate closure site 308. In operation, the closure element is insertable through internal passage 30 to closure site 308, such that the closure element is received in an interference fit proximate closure site 308. At least one passage wall 304 on a first side 310 of closure site 308 is shaped to enable insertion of the closure element through internal passage 30, and a shape of the at least one passage wall 304 on an opposite second side 312 is configured to couple against the closure element in an interference fit.

However, in accordance with embodiments of the disclosure, as shown in FIGS. 3 and 4, the at least one passage wall 304 is irregular. As used herein, "irregular" indicates internal passage 30 and passage wall 304 may not be generally circular and may not have the desired diameter that approximates the diameter of a conventional ball-shaped closure element. In this situation, a conventional closure element, e.g., a metallic ball, may fall through a bottom of internal passage 30 at opposite second side 312 or lodge in a location that does not match the intended closure site 308. When this occurs, sealing of internal passage 30 may be insufficient or non-existent. The irregularity can be caused by a defect 320. "Defect" 320 may include any change in the shape and size of at least one passage wall 304 and/or closure site 308 from that initially intended to allow use of a conventional, typically spherical closure element. For example, as shown in FIG. 3, at least one passage wall 304 may be formed with defect 320 therein, e.g., by a misshapen ceramic core during investment casting or improper formation during additive manufacturing. Where coating 322 is provided, as shown in FIG. 4, the removal of coating 322 at closure site 308 may result in defect 320 in at least one passage wall 304, e.g., by removal of coating 322 creating an oversized or misshapen closure site. Defect 320 may include both a change in passage wall(s) 304 and coating 322. Defect 320, regardless of form, may extend entirely about closure site 308 or only partially thereabout.

Figure 5:
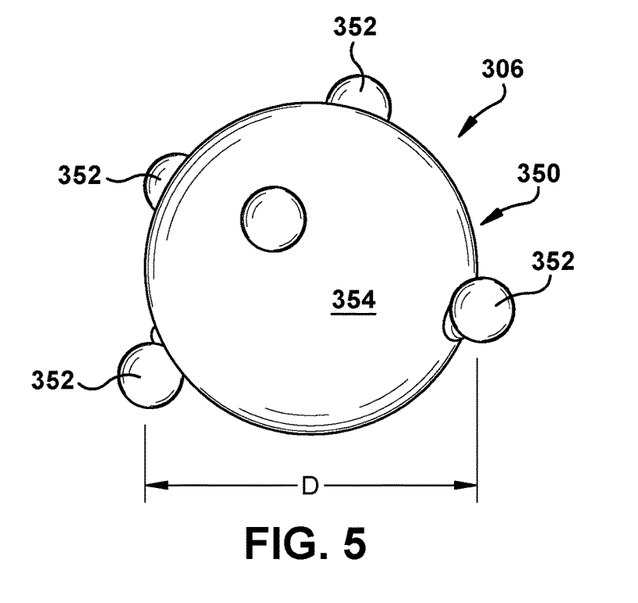
FIG. 5 is a schematic section view of a closure element according to embodiments of the disclosure.
Figure 6:
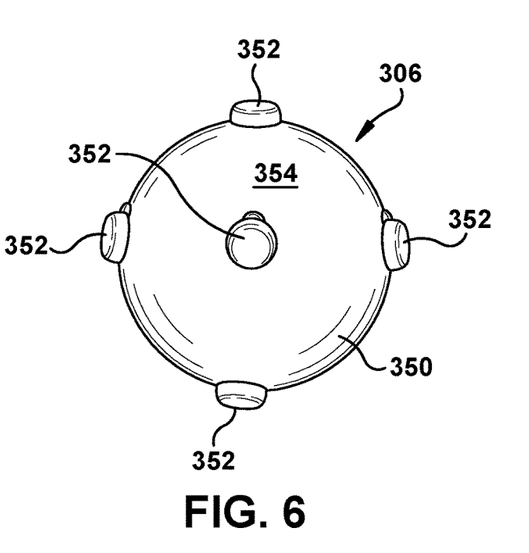
FIG. 6 is a schematic section view of a closure element according to another embodiment of the disclosure.
Figure 7:
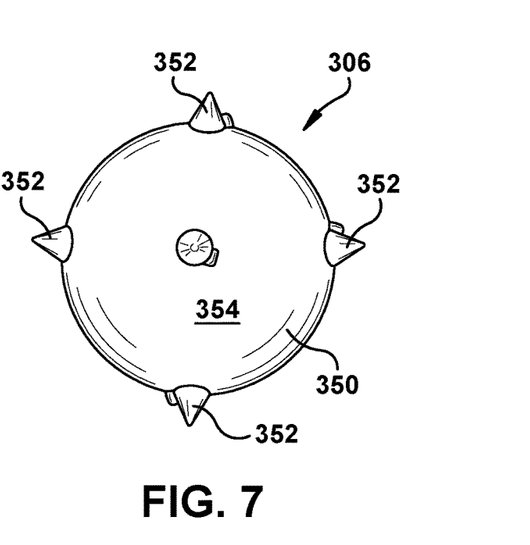
FIG. 7 is a schematic section view of a closure element according to another embodiment of the disclosure.

In order to address the challenge presented by the irregularity of defects 320, as shown in the perspective views of FIGS. 5-7, closure element 306 according to embodiments of the disclosure includes a generally spherical body 350, and as will be described, a plurality of extensions 352 extending from a surface 354 of spherical body 350. In the illustrative embodiment, spherical body 350 is formed from a material that is suitable for use in high-temperature and/or corrosive environments. Notably, spherical body 350 may be made of a superalloy. For example, spherical body 350 may be made of a first superalloy, such as a nickel-based superalloy, a cobalt-based superalloy, and an iron-based superalloy. In non-limiting examples, spherical body 350 may be formed from a Hastelloy material, i.e., a nickel-chromium-iron-molybdenum superalloy; Inconel 624; or Haynes 25. In alternative embodiments, spherical body 350 is formed from any suitable material, or combination of materials, that enables spherical body 350 to function as described herein, e.g., any superalloy listed herein for substrate 302. Spherical body 350 may have any diameter to accommodate sealing of internal passage 30 in component 38 at closure site 308, but typically has a diameter intended to seal internal passage 30 at closure site 308 where defect 320 is not present. That is, spherical body 350 has a diameter too small to seat in closure site 308. In one non-limiting example, spherical body 350 may have a diameter in a range of 3 millimeters to 10 millimeters, depending on the intended size of closure site 308 without defect 320.

In contrast to conventional closure elements, closure element 306 also includes a plurality of extensions 352 extending from a surface 354 of spherical body 350. Plurality of extensions 352 may take any variety of shape and size configured to ensure closure element 306 is positioned at closure site 308 with defect 320. More particularly, plurality of extensions 352 may have a shape and size to ensure closure element 306 is positioned at closure site 308 despite the presence of defect 320, the latter of which has changed the shape and/or size of at least one passage wall 304 and/or closure site 308 from that initially intended to allow use of a closure element without the extensions. Extensions 352 may have any of a variety of shapes configured to seat closure element 306 in closure site 308. In FIG. 5, extensions 352 have a generally sphere (ball) shape. In FIG. 6, extensions 352 have a round plate shape. In FIG. 7, extensions 352 have a cone shape. While particular example of extension 352 shapes have been illustrated, it is emphasized that a large variety of other alternatives are possible, and are considered a part of the disclosure.

Extensions 352 may be distributed in any manner allowing for seating of closure element 306 in closure site 308. In one embodiment, extensions 352 are uniformly distributed, i.e., they are evenly or nearly evenly spaced about spherical body 306. For example, as shown in FIGS. 5-7, extensions 352 may include six uniformly distributed extensions with each extension 352 diametrically opposed from another extension 352 across spherical body 350. In other embodiments, extensions 352 may be symmetrically distributed about spherical body 350, i.e., as shown in FIGS. 5-7.

Although extensions 352 can be the same material as spherical body 350, in one embodiment, extensions 352 include a second superalloy that is different than the superalloy of spherical body 350. Extensions 352 may include, for example, a nickel-based superalloy, a cobalt-based superalloy, and an iron-based superalloy. For example, Hastelloy X; Inconel 625; or Haynes 25. Extensions 352 may have any size configured to ensure engagement at closure site 308. For example, extensions 352 may have a size configured to enlarge spherical body 350 to accommodate defect 320. For example, each extension 352 may have a dimension, e.g., radial or circumferential relative to spherical body 350, in a range of 0.3 millimeters to 5 millimeters. In any event, the dimension of each extension 352 is smaller than, and typically significantly smaller (e.g., <15%), of the diameter of spherical body 350. As illustrated, in some embodiments, e.g., FIG. 6, closure element 306 may have a shape resembling a naval mine.

Closure element 306 may be formed in a number of ways. Spherical body 350 may be formed using any now known or later developed techniques, e.g., grinding, casting, additive manufacture, etc. With the presence of defect 320 (FIGS. 3 and 4), spherical body 350 may have a diameter D (see e.g., FIG. 5) incapable of seating in closure site 308 of internal passage 30 in component 38. Closure element 306, and in particular, extensions 352 may be further formed by attaching extensions 352 to surface 354 of spherical body 350. Extension 352 may be separately formed using any now known or later developed techniques, e.g., grinding, casting, additive manufacture, etc., and attached using any variety of welding technique appropriate for the material used. For example, extensions 352 may be tack welded to surface 354 of spherical body 350. In another example, extensions 352 may be fusion welded to surface 354 of spherical body 350. In another embodiment, spherical body 350 and extensions 352 may be formed simultaneously, e.g., using casting or additive manufacturing.

As shown in FIGS. 3 and 4, spherical body 350 and extensions 352 are collectively sized and shaped to be received against at least one internal passage wall 304 in an interference fit proximate closure site 308 of internal passage 30. As further shown in FIGS. 3 and 4, closure element 306 may further include a braze material 314 disposed about spherical body 350 and extensions 352. Braze material 314 may be added to closure element 306 prior to insertion into internal passage 30, or after insertion. In any event, closure element 306 may be securely coupled to passage wall(s) 304 by braze material 314. A braze material is a material that has a lower melting point than a melting point of substrate 302 and closure element 306, and provides a substantial match with other select chemical properties of substrate 302 and closure element 306. For example, before, after, and/or simultaneously with, positioning closure element 306 proximate closure site 308, braze material 314 is applied as a material to at least one of closure element 306 and the at least one passage wall 304, and the assembly is then heated in a suitable thermal cycle(s) such that braze material 314 metallurgically bonds with closure element 306 and the at least one passage wall 304. For example, but not by way of limitation, substrate 302 may be formed from a nickel alloy, and braze material 314 may be formed at least partially from a nickel brazing alloy. In a particular embodiment, substrate 302 is formed from a nickel alloy, and braze material 314 includes Amdry DF4B, which is a nickel brazing alloy. In alternative embodiments, braze material 314 is any suitable material that enables closure element 306 to function as described herein.

In accordance with a method according to embodiments of the disclosure, as shown in FIGS. 3 and 4, closure element 306 is inserted into internal passage 30 of component 38. Closure element 306 includes spherical body 350 and plurality of extensions 352 extending from surface 354 of the spherical body. As illustrated, at least one of plurality of extensions 352 engages with passage wall(s) 304 of internal passage 30 to position spherical body 350 at closure site 308. In this manner, even though defect 320 is present, closure element 306 seats where necessary to seal internal passage 30. In one embodiment, braze material 314 may be applied at closure site 308 in any suitable fashion that enables closure element 306 to function as described herein. In certain embodiments, braze material 314 is applied using a tool (not shown) inserted from first side 310, such that braze material 314 is fit at least partially within the space defined between closure element 306 and the at least one passage wall 304 adjacent braze material 314. For example, the tool is used to push braze material 314 tightly into the space defined between closure element 306 and the at least one passage wall 304 adjacent braze material 314. Additionally or alternatively, vacuum pressure is used to position braze material 314 at least partially within the space defined between closure element 306 and the at least one passage wall 304 adjacent braze material 314. It should be understood that, in certain embodiments, formation and bonding of closure element 306 is facilitated by suitable cleaning and decontamination procedures proximate closure site 308 prior to applying braze material 314. For example, but not by way of limitation, mechanical cleaning along a small length of internal passage 30 extending from closure element 306 along first side 310 may be performed prior to applying braze material 314.

With respect to FIG. 4, an alternative embodiment of the method may include, prior to inserting closure element 306, applying anti-oxidation coating 322 over passage wall(s) 304 of internal passage 30, and removing anti-oxidation coating 322 at closure site 308. The application of anti-oxidation coating 322 can be made using any now known or later developed applicator, e.g., slurry process for an aluminide coating. The removing may be made, for example, manually using a mechanical grinding tool.

Figure 8:
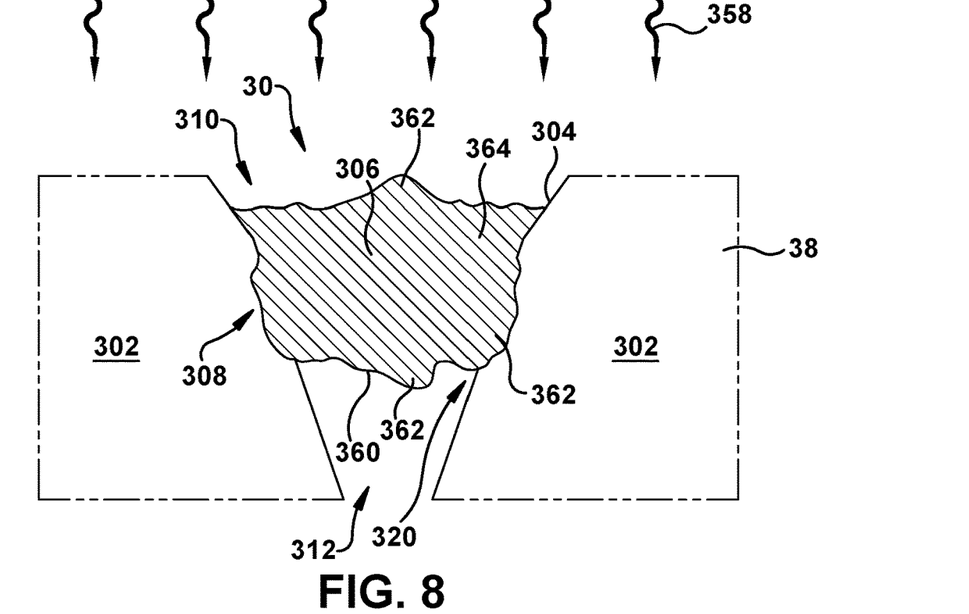
FIG. 8 is a schematic section view of a thermal cycle(s) being applied to the closure element of FIG. 3, according to embodiments of the disclosure.
Figure 9:
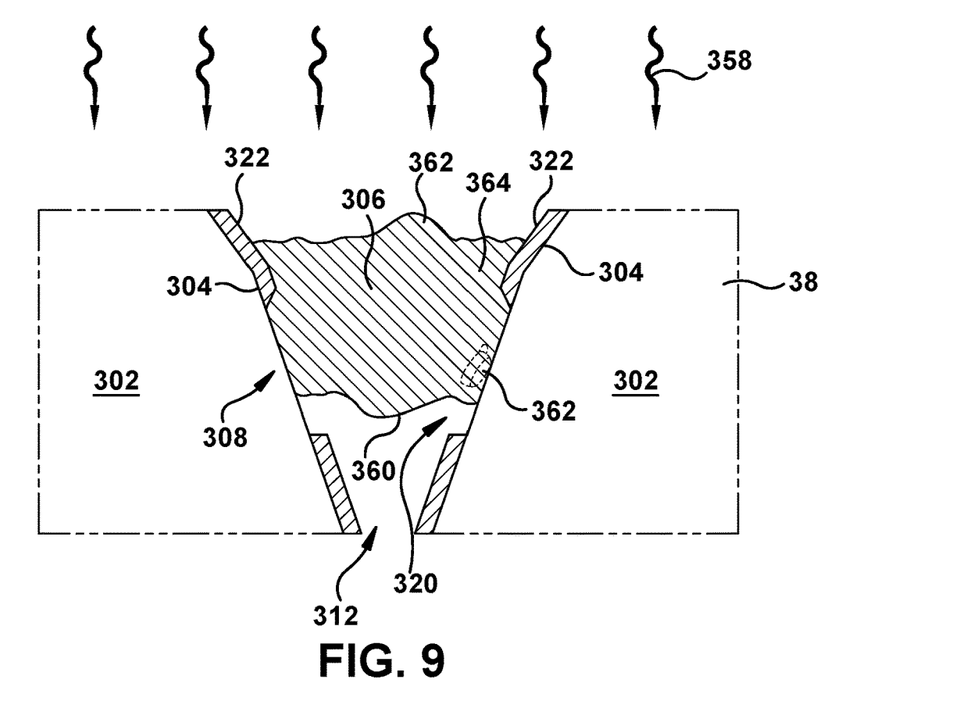
FIG. 9 is a schematic section view of a thermal cycle(s) being applied to the closure element of FIG. 4, according to embodiments of the disclosure.

FIGS. 8 and 9 are schematic views corresponding to the FIGS. 3 and 4 embodiments, respectively, and showing subjecting component 38 to at least one thermal cycle 358 such that braze material 314 forms a metallurgical bond 360 with spherical body 350, extensions 352 and passage wall 304 to seal internal passage 30. Metallurgical bond 360 melds the different parts into one member, with perhaps remnants 362 of extensions 352 (FIGS. 3 and 4) still visible after exposure to thermal cycle(s) 358. The thermal cycle(s) 358 may be at any temperature required to sufficiently braze the materials used to form metallurgical bond 360. In a non-limiting example, the thermal cycle(s) may include one or more cycles in a range of 2050 to 2350° F. (1121 to 1287° C.).

In an alternative embodiment, the method may also include forming closure element 306, as described herein. That is, by attaching extensions 352 to surface 354 of spherical body 350, where spherical body 350 has a diameter D incapable of seating in closure site 308 of internal passage 30 in component 38. As noted, the attaching may include, for example, tack welding and/or fusion welding the plurality of extensions to the surface of the spherical body.

As shown in FIG. 2, component 38 may include a turbine blade or nozzle (vane). In this case, component 38 may include a body 32, and an internal passage 30 in body 32. Internal passage 30 includes, and is defined by, passage wall(s) 304. Internal passage 30 may be used a part of a cooling circuit in the turbine blade or nozzle. In addition or alternatively, internal passage 30 may be formed as a ball chute through which a leachant may pass to remove a wax mold used to form a ceramic core, e.g., during an investment casting process, and which remains in the molded component and must be sealed. The turbine blade or nozzle also includes closure element 306 at closure site 308 in internal passage 30. As shown in FIGS. 8 and 9, closure element 306 includes a brazed spherical body 364, and brazed extensions (shown as remnants 362) in brazed spherical body 350, e.g., where closure element 306 does not interact with passage wall(s) 304. As noted, brazed spherical body 364 and brazed extensions (remnants 362) form metallurgical bond 360 with passage wall(s) 304 to seal internal passage 30.

Illustrative embodiments of a closure element and method for sealing an internal passage of a component are described above in detail. The embodiments provide an advantage over at least some known systems for sealing such passages, in that sealing the passage is accomplished even in the presence of an irregularly shaped or oversized closure site.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A closure element for an internal passage in a component, the closure element comprising:
a spherical body, the spherical body made of a first superalloy; and
a plurality of extensions extending from a surface of the spherical body, the plurality of extensions made of a material other than the first superalloy and bonded to the spherical body before the closure element is received in the internal passage,
wherein the plurality of extensions each has a shape of a sphere, a cone or a round plate.

2. The closure element of claim 1, wherein the first superalloy is selected from the group comprising: a nickel-based superalloy, and a cobalt-based superalloy, and an iron-based superalloy;
wherein the plurality of extensions includes a second superalloy selected from the group comprising: a nickel-based superalloy, a cobalt-based superalloy, and an iron-based superalloy;
wherein the first superalloy is different than the second superalloy.

3. The closure element of claim 1, further comprising a braze material disposed about the spherical body and the plurality of extensions.

4. The closure element of claim 1, wherein the spherical body has a diameter in a range of 3 millimeters to 10 millimeters, and each extension has a dimension radially extending from the surface of the spherical body in a range of 0.3 millimeters to 5 millimeters, wherein the dimension of each extension is smaller than the diameter of the spherical body.

5. The closure element of claim 1, wherein the spherical body with the plurality of extensions are collectively sized and shaped to be received against at least one internal passage wall in an interference fit proximate a closure site of the internal passage.

6. A closure element for an internal passage in a component, the closure element comprising:
a spherical body, the spherical body made of a first superalloy; and
a plurality of extensions extending from a surface of the spherical body, the plurality of extensions made of a material other than the first superalloy, wherein the plurality of extensions includes uniformly distributed extensions.

7. The closure element of claim 6, wherein the uniformly distributed extensions include six uniformly distributed extensions.

8. The closure element of claim 6, wherein the plurality of extensions are symmetrically distributed about the spherical body.

9. A method, comprising:
inserting a closure element into an internal passage of a component, the closure element including a spherical body and a plurality of extensions extending from a surface of the spherical body, wherein at least one of the plurality of extensions engages with a passage wall of the internal passage to position the spherical body at a closure site;

applying a braze material at the closure site; and subjecting the component to at least one thermal cycle such that the braze material forms a metallurgical bond with the spherical body, the plurality of extensions and the passage wall to seal the internal passage, wherein the plurality of extensions were bonded to the spherical body before the closure element is inserted into the internal passage, and wherein the plurality of extensions each has a shape of: a sphere, a cone or a round plate.

10. The method of claim 9, further comprising forming the closure element by attaching the plurality of extensions to a surface of the spherical body, the spherical body having a diameter incapable of seating in the closure site of the internal passage in the component.

11. The method of claim 10, wherein attaching the plurality of extensions includes tack welding the plurality of extensions to the surface of the spherical body.

12. The method of claim 10, wherein attaching the plurality of extensions includes fusion welding the plurality of extensions to the surface of the spherical body.

13. The method of claim 9, further comprising, prior to the inserting:

applying an anti-oxidation layer over the passage wall of the internal passage; and removing the anti-oxidation layer at the closure site.

14. The method of claim 9, wherein the spherical body has a diameter in a range of 3 millimeters to 10 millimeters, and each extension has a dimension radially extending from the surface of the spherical body in a range of 0.3 millimeters to 5 millimeters, wherein the dimension of each extension is smaller than the diameter of the spherical body.

15. The method of claim 14, wherein the spherical body includes a first superalloy selected from the group comprising: a nickel-based superalloy, a cobalt-based superalloy and an iron-based superalloy;

wherein the plurality of extensions include a second superalloy selected from the group comprising: a nickel-based superalloy, a cobalt-based superalloy, and an iron-based superalloy;

wherein the first superalloy is different than the second superalloy.

16. The method of claim 13, wherein the spherical body with the plurality of extensions are collectively sized and shaped to be received against the passage wall in an interference fit proximate the closure site of the internal passage.

17. A turbine blade or nozzle, comprising:

a body;

an internal passage in the body, the internal passage including a passage wall;

a closure element at a closure site in the internal passage, the closure element including a spherical body, and a plurality of extensions in a surface of the spherical body, the spherical body and the plurality of extensions forming a metallurgical bond with the passage wall to seal the internal passage, wherein the plurality of extensions were bonded to the spherical body before the closure element is received in the internal passage, and wherein the plurality of extensions each has a shape of: a sphere, a cone or a round plate.

18. The turbine blade or nozzle of claim 17, wherein the spherical body includes a first superalloy selected from the group comprising: a nickel-based superalloy, a cobalt-based superalloy, and an iron-based superalloy;

wherein the plurality of extensions include a second superalloy selected from the group comprising: a nickel-based superalloy, a cobalt-based superalloy, and an iron-based superalloy; and wherein the first superalloy is different than the second superalloy.

19. The turbine blade or nozzle of claim 17, wherein the plurality of extensions include uniformly distributed extensions.

* * * * *